May 13, 1958
L. STEVENS
2,834,390
RESILIENT COIL PAWL AND RATCHET TYPE NUT AND BOLT LOCK
Filed Dec. 7, 1953
3 Sheets-Sheet 1
FIG_1_
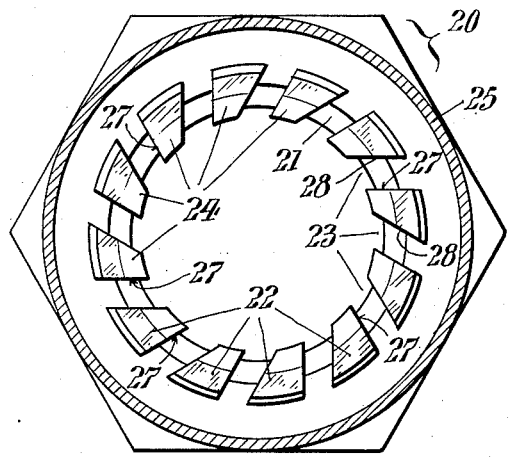
FIG_3_
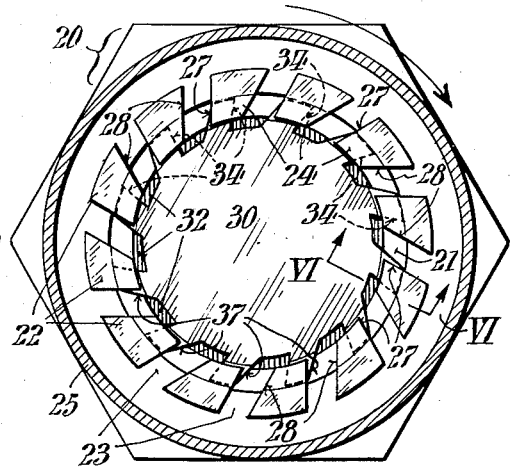
FIG_2_
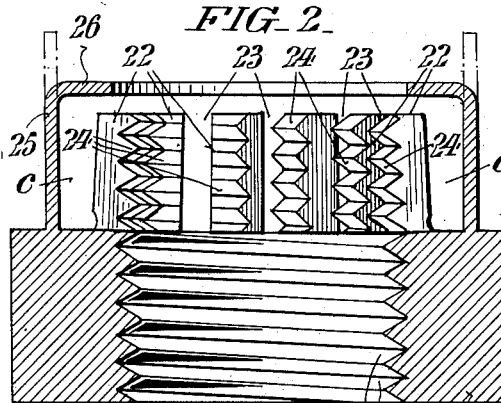
FIG_4_
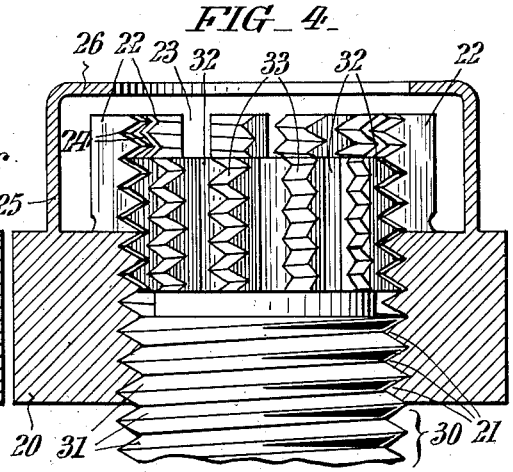
FIG_5_
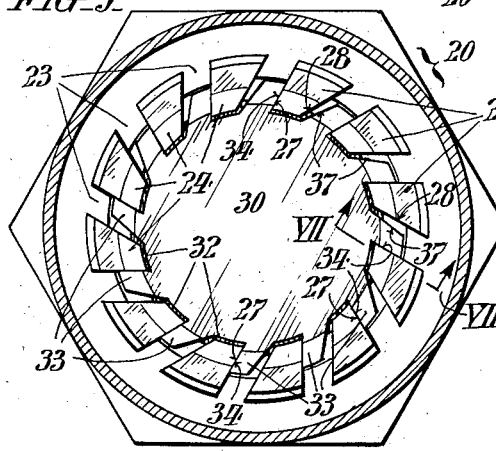
FIG_6_ 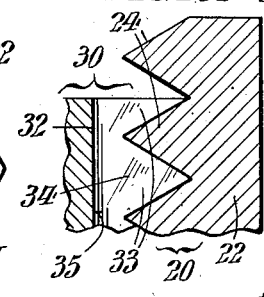 FIG_7_ 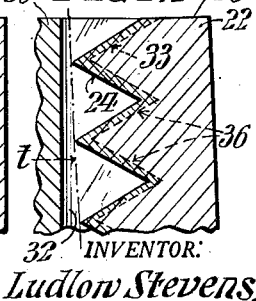
INVENTOR:
Ludlow Stevens,
BY
Paul & Paul
ATTORNEYS.

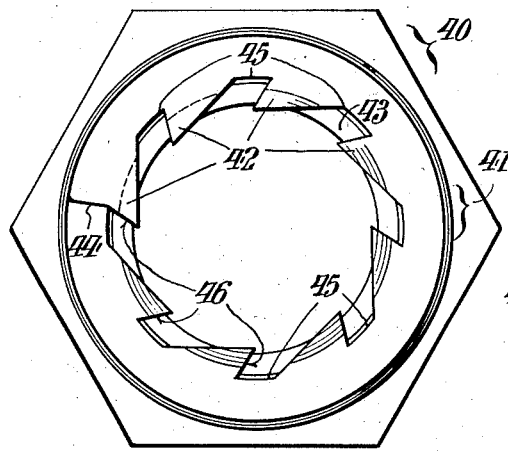
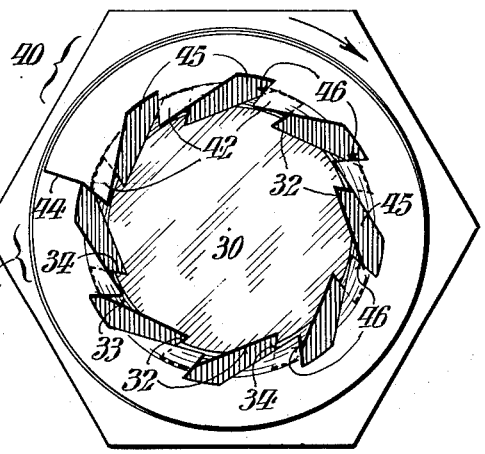
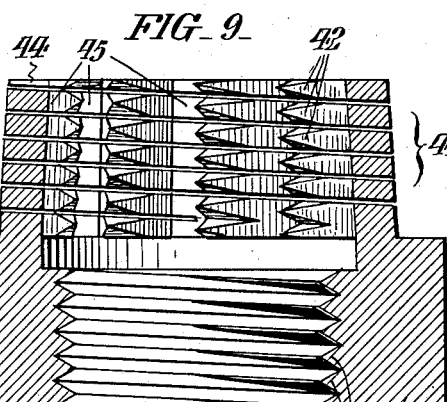
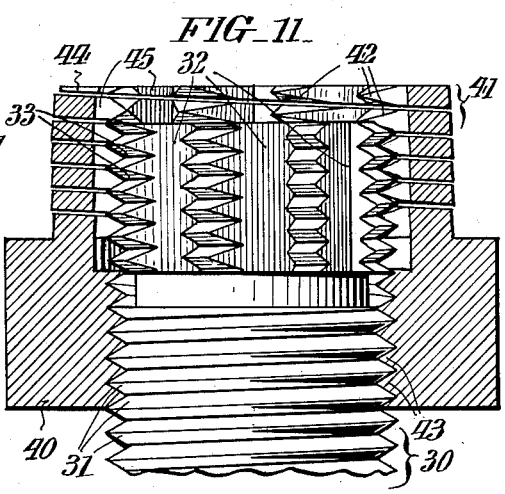
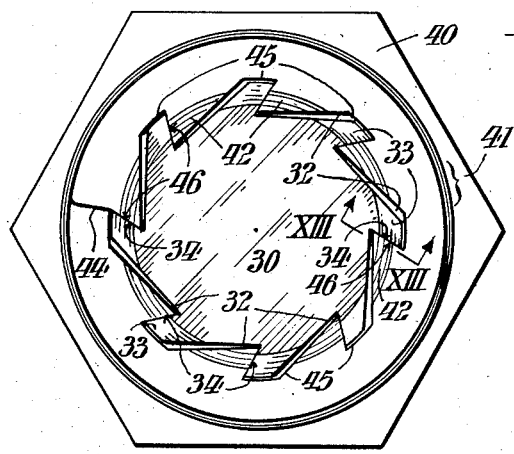
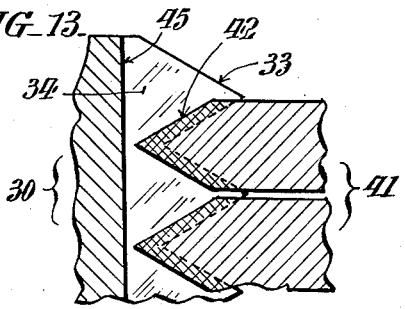
INVENTOR:
Ludlow Stevens,
BY Paul & Paul
ATTORNEYS.

May 13, 1958   L. STEVENS   2,834,390
RESILIENT COIL PAWL AND RATCHET TYPE NUT AND BOLT LOCK
Filed Dec. 7, 1953   3 Sheets-Sheet 3
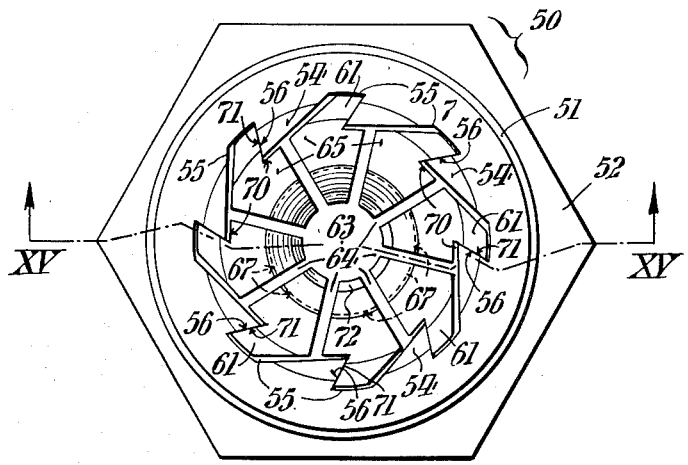
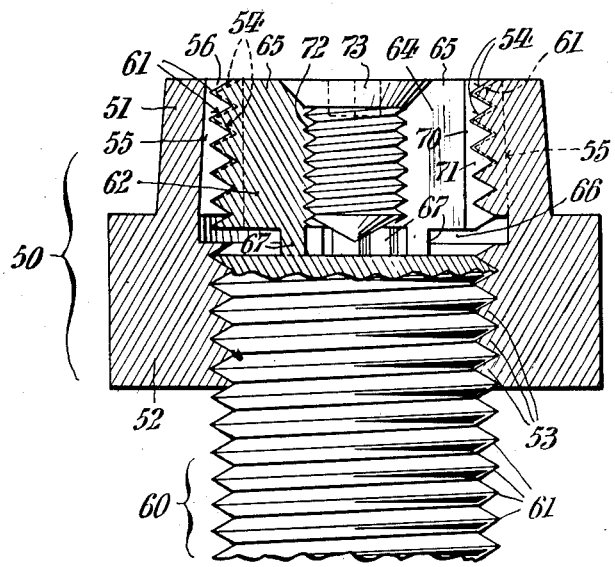
INVENTOR:
*Ludlow Stevens,*
BY *Paul & Paul*
ATTORNEYS.

United States Patent Office 2,834,390
Patented May 13, 1958

2,834,390

RESILIENT COIL PAWL AND RATCHET TYPE NUT AND BOLT LOCK

Ludlow Stevens, Philadelphia, Pa.

Application December 7, 1953, Serial No. 396,476

1 Claim. (Cl. 151—11)

This invention relates to a self-locking nut and bolt. One of the objects of the invention is to provide a nut and bolt combination having capacity to be threaded together in one direction, but which cannot, after tightening, be turned in the opposite direction.

Various lock nut constructions have previously been disclosed by others, and some have been patented. However, conventional lock nuts, or "pinch" nuts are sometimes dislodged or loosened by trembling vibrations caused by centrifugal or centripetal oscillations, and by combinations of torsional, lateral and axial vibration. Moreover, conventional lock nuts and bolts are either excessive in cost or unreliable when subjected to severe usage of other types. Others are cumbersome and complicated, and are not suitable for use in a confined space.

It is accordingly another object of this invention to provide a self-locking self-grasping nut and bolt combination which is compact, relatively inexpensive to manufacture, and which remains tightly locked even under severe conditions of vibration, even complex and severe forms of vibration, combined with shock and the like. Other objects and advantages of this invention will further become apparent hereinafter and in the drawings whereof:

Fig. 1 represents a plan view of a lock nut comprising one embodiment of this invention;

Fig. 2 represents a vertical sectional view of the nut shown in Fig. 1;

Figs. 3 and 4 represent views similar to Figs. 1 and 2 showing the bolt partially threaded into the nut. In Fig. 4 the bolt is shown in full elevation while the nut is shown in section;

Fig. 5 represents a plan view similar to Fig. 3, showing the nut and bolt slightly rotated relative to one another, in order more clearly to illustrate the construction and operation of the self-locking members of the nut and bolt;

Figs. 6 and 7 represent enlarged sectional views taken as indicated by the lines and arrows VI—VI and VII—VII which appear in Figs. 3 and 5 respectively;

Fig. 8 represents a plan view of a self-locking nut comprising another embodiment of this invention;

Fig. 9 represents a vertical sectional view of the nut shown in Fig. 8;

Figs. 10 and 11 represent views similar to Figs. 8 and 9, showing the bolt partially threaded into the nut;

Fig. 12 represents a view similar to Fig. 10, showing the nut and bolt slightly rotated relative to one another, in order more clearly to illustrate the construction and operation of the locking members;

Fig. 13 represents an enlarged sectional view taken as indicated by the lines and arrows XIII—XIII which appear in Fig. 12;

Fig. 14 represents a plan view showing a combined lock bolt and nut comprising another embodiment of this invention; and Fig. 15 represents a vertical sectional view of the lock nut and bolt shown in Fig. 14, the bolt being shown in full elevation except at its upper end.

Turning now to the specific embodiment of the invention selected for illustration in the drawings, the number 20 designates a nut having threads 21 of uniform pitch and angle. Formed integrally with one end of nut 20 are a plurality of pillars 22 having slots 23 between them. Pillars 22 have threads 24 on their inside surfaces which are continuations of threads 21. However, pillars 22 are tapered toward the central longitudinal axis of the nut, with their free ends closer together than their bases, and the threads 24 are correspondingly tapered. Formed integrally with nut 20 is a cylindrical guard 25 having an inturned rim 26. Guard 25 is spaced outwardly of the pillars 22, providing an intervening expansion channel C.

Slots 23 form locking surfaces 27 on the pillars, this being an important feature of the invention. Fig. 1 shows that the slots 23 extend between pillars 22 at an angle to the radius, each locking surface 27 being at substantially the same angle to the radius. The pillars are spring steel or the like, and their free ends have capacity to move toward and away from the longitudinal central axis of nut 20.

Turning to Figs. 3 and 4, a bolt 30 is provided having uniform threads 31 corresponding in pitch and angle to the threads 21 of nut 20. At its end the bolt 30 has a plurality of equally-spaced, longitudinally extending grooves 32 which extend through the threads of the bolt, forming threaded teeth 33. Grooves 32 are deeper than threads 31, and extend non-radially into the bolt, whereby teeth 33 have locking surfaces 34 which are angular relative to the radius. The length of grooves 32 is not critical, but grooves 32 preferably extend through several threads 31, and they should extend to the free end of the bolt.

In the operation of the lock nut and bolt shown in Figs. 1–7, the bolt is advanced toward the free ends of pillars 22 by relatively revolving the nut and bolt. When the bolt reaches the position shown in Fig. 4, its threads bear outwardly against the threads 24 of the pillars 22, whereby the bolt urges and moves the pillars 22 radially outwardly, overcoming their resilient opposition to this movement. As shown in Fig. 3, for example, each pillar 22 is urged outwardly by the threaded teeth 33 which travel in a helical path in the pillar threads 24. When the nut is revolved slightly relative to the bolt in the direction indicated in Fig. 3, past the relative position shown in Fig. 3, the pillars snap resiliently inwardly to the position shown in Fig. 4. The pillars move into the spaces provided by the longitudinal grooves 32, which are deeper than the threads. The angularly related locking surfaces 27, 34 come into engagement, locking the nut and bolt against relative movement in reverse.

The expansion channel C provides space for the movement of pillars 22 outwardly toward guard 25, and for relative expansion and contraction of these parts due to any hot or cold conditions to which the device may be subjected.

Fig. 6 shows how the threads 34 of the bolt maintain the pillar 22 away from the base 35 of the groove in bolt 30. Fig. 7 shows the pillar 22 displaced inwardly with its threads extending into the groove 32, below the outer surfaces 36 of the threaded teeth 33 of bolt 30. The line $t$ in Fig. 7 shows that the teeth of the pillar 22 have returned, at least partially, to their initial tapered or inclined arrangement.

Even after locking as just described, the nut and bolt may be further revolved in the relative direction indicated in Fig. 3. The angular slopes of the forward surfaces 28 of the pillars serve as cam followers, moving the pillars outwardly under the influence of the angular cam surfaces 37 on the bolt. It will accordingly be apparent that, upon continued relative turning of the nut and bolt, the pillars are successively locked and unlocked, with the result that revolution is permitted in only one direction.

The modified form of the invention, as shown in Figs. 8–13, includes a nut 40 having formed integrally therewith a resilient spiral or helix 41. The inner surface of the spiral 41 is provided with threads 42 having the same pitch and angle as the threads 43 at the base of the nut. But the spiral is tapered inwardly toward its free end 44, and its threads are similarly tapered. Spiral 41 has a plurality of longitudinally extending grooves 45 extending through the threads 42, deeper than the threads 42. Grooves 45 extend at an angle to the radius, forming locking surfaces 46.

The bolt shown in Figs. 8–13 is substantially identical to the bolt 30 shown in Figs. 1–7, and its parts are similarly numbered.

In the operation of the lock nut and bolt shown in Fig. 8, when bolt 30 and nut 40 are threaded together, the threads of bolt 30 bear against the threads of the spiral 41, causing spiral 41 resiliently to uncoil. Each time the teeth of the spiral come into registry with a slot on the bolt, the spiral contracts helically and the members lock in a manner similar to that described in connection with Figs. 1–7. As in Figs. 1–7, the bolt of Figs. 8–13 may be further rotated after locking, but in one direction only.

Turning now to Figs. 14 and 15, the nut 50 has a rigid annular wall 51. The base 52 and wall 51 are internally threaded by continuous threads of the same angle and pitch, but the threads 53 of the base are of constant diameter while the threads 54 of the annular wall 51 are tapered inwardly. Longitudinal grooves 55 extend through threads 54, and are disposed at an angle to the radius, forming locking surfaces 56.

Bolt 60 has uniform threads 61 of uniform pitch, angle and diameter. The free end 62 of bolt 60 has a central bore 63 and is slotted along a plurality of diameters, the slots being designated by the number 64. Slots 64 extend longitudinally, substantially parallel to the axis of bolt 60, forming a plurality of spaced-apart, parallel pillars 65 on the bolt. Desirably, but not necessarily, the bolt 60 is circumferentially grooved or undercut at 66, whereby each pillar 65 is supported on a base 67 of reduced diameter. Each pillar 65 is longitudinally grooved at 70, each groove 70 extending through the threads 61 and being deeper than threads 61. Each groove 70 extends at an angle to the radius, forming locking surfaces 71 which coact with the locking surfaces 56 of nut 60 in the manner heretofore described.

Preferably, the bore 63 is internally threaded at 72 and a screw 73 (Fig. 15) is provided having threads corresponding to the threads 72.

The operation of the device shown in Figs. 14 and 15 is comparable to that of the other forms of the invention disclosed herein, but the annular ring 51 is rigid and the pillars 65 on the bolt 60 are urged resiliently inwardly by the tapered threads 54, screw 73 being removed. Pillars 65 spring outwardly upon coming into registry with the grooves 55, locking the bolt and nut against reverse rotation. The pillars 65 may be secured in locked position by threading the screw 73 into the bore 63, spreading the pillars outwardly.

It will be appreciated that the devices shown in the drawings and described herein may be modified in various ways without departing from the scope of the invention. While the drawings disclose an interlocking effect which is obtained by relative movement of the respective sets of threads in a radial direction, a relative thread movement in an axial direction may be employed to obtain a similar result. For example, the spiral shown in Figs. 9 and 11 may be provided with threads which are slightly displaced axially relative to the threads of the bolt 30. When the bolt 30 is threaded into such displaced spiral threads, the bolt threads cause the spiral to expand axially. This displacement places the spiral under axial tension and effects a misalignment of the corresponding longitudinal grooves of the spiral and of bolt 30. Whenever a nut thread comes into registry with one of the longitudinal grooves on the bolt, it returns elastically in an axial direction and thereby enters into a locking engagement with the bolt. By reason of the groove misalignment and the axial tension, the locking engagement is caused to occur in a more continuous manner than where no axial displacement has occurred and the longitudinal grooves are therefore in alignment. A similar axial displacement may be obtained in the device shown in the other figures of the drawings, simply by providing threads which have sufficient elasticity, in an axial direction, of themselves. It will be appreciated that only a very slight axial thread displacement is necessary, since many interlocking surfaces are coupled, and they have a very substantially additive locking effect.

Although I have described my invention by reference to one embodiment thereof, it will be apparent to those skilled in the art that various changes other than those referred to above may be made in the form of the device, that equivalent elements may be substituted for those illustrated in the drawings, and that certain features of the invention may be used to advantage independently of the use of other features, all within the spirit of invention as defined in the annexed claim.

Having thus described my invention, I claim:

In combination, a nut and bolt which are correspondingly threaded, said nut having a threaded resilient coiled portion comprising a plurality of complete, generally helically arranged and connected turns, said coiled portion being longitudinally displaced and disposed about and extending along the central longitudinal axis of said nut, the threads of said coiled portion being tapered relative to the threads of said bolt and being axially displaced relative to said bolt threads in the direction of the body of said nut, whereby the coiled portion is elastically unwound or uncoiled and axially extended when the nut and bolt are threaded together, and said bolt and said coiled portion each having longitudinally extending grooves forming coacting teeth having sets of corresponding locking surfaces which extend at an angle to the radius and are resiliently locked to one another when the nut and bolt are threaded together.

References Cited in the file of this patent

UNITED STATES PATENTS

| | | |
|---|---|---|
| 599,554 | Dye | Feb. 22, 1898 |
| 1,010,264 | Jaques | Nov. 28, 1911 |
| 1,195,454 | Faubel | Aug. 22, 1916 |
| 1,364,553 | Hilsabeck | Jan. 4, 1921 |
| 1,421,090 | Larson | June 27, 1922 |
| 1,467,907 | Miyagi | Sept. 11, 1923 |
| 2,106,669 | Thornton | Jan. 25, 1938 |
| 2,306,806 | Hoopes | Dec. 29, 1942 |
| 2,342,170 | Tennerman | Feb. 22, 1944 |
| 2,601,651 | Wandy | June 24, 1952 |

FOREIGN PATENTS

| | | |
|---|---|---|
| 12,524 | Great Britain | Oct. 2, 1886 |
| 2,771 | Great Britain | Feb. 24, 1888 |